(12) United States Patent
Fujii et al.

(10) Patent No.: US 7,539,384 B2
(45) Date of Patent: May 26, 2009

(54) OPTICAL WAVEGUIDE AND METHOD OF MANUFACTURING THE SAME

(75) Inventors: Akira Fujii, Kanagawa (JP); Toshihiko Suzuki, Kanagawa (JP); Keishi Shimizu, Kanagawa (JP); Kazutoshi Yatsuda, Kanagawa (JP); Shigemi Ohtsu, Kanagawa (JP); Eiichi Akutsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/783,032

(22) Filed: Apr. 5, 2007

(65) Prior Publication Data

US 2008/0013903 A1     Jan. 17, 2008

(30) Foreign Application Priority Data

Jul. 13, 2006    (JP)    ............................. 2006-192951

(51) Int. Cl.
*G02B 6/10*    (2006.01)

(52) U.S. Cl. ...................... 385/129; 385/130; 385/131; 385/132

(58) Field of Classification Search ........... 385/129–132
See application file for complete search history.

(56) References Cited

U.S. PATENT DOCUMENTS 5,982,970 A * 11/1999 Schneider .................... 385/125

FOREIGN PATENT DOCUMENTS

| JP | A 2002-333538 | 11/2002 |
| JP | A 2003-215368 | 7/2003 |
| JP | A 2004-29507 | 1/2004 |

* cited by examiner

*Primary Examiner*—Jennifer Doan
(74) *Attorney, Agent, or Firm*—Oliff & Berridge, PLC

(57) ABSTRACT

An optical waveguide comprises: a core for propagating light; a clad covering the core; and a line convex part extending along a line different from the core, the line convex part comprising a cavity used as a positioning mark inside the line convex part.

12 Claims, 10 Drawing Sheets

(FIRST EXEMPLARY EMBODIMENT)

*FIG. 1*
*( FIRST EXEMPLARY EMBODIMENT )*

FIG. 2
(SECOND EXEMPLARY EMBODIMENT)

FIG. 4
(MODIFICATION 1)

FIG. 5
(MODIFICATION 2)

FIG. 6
( MODIFICATION 3 )

FIG. 7
( MODIFICATION 4 )

FIG. 8
( MODIFICATION 5 )

FIG. 9
(EXAMPLE 1)

(EXAMPLE 2)

OPTICAL WAVEGUIDE AND METHOD OF MANUFACTURING THE SAME

CROSS-REFERENCE TO RELATED APPLICATIONS

This application is based on and claims priority under 35 USC 119 from Japanese Patent Application No. 2006-192951 filed Jul. 13, 2006.

BACKGROUND (i) Technical Field

The present invention relates to an optical waveguide and a method of manufacturing the same and, more particularly, to an optical waveguide having a positioning mark and a method of manufacturing the same.

(ii) Related Art

Various methods for manufacturing a polymer optical waveguide have been proposed in the related art including, for example:

(1) a method in which films are impregnated with a monomer and in which the films are combined with the refractive index of a core part varied by selectively exposing the same (selective polymerization method);

(2) a method in which a core layer and a clad layer are applied, and a clad part is thereafter formed using reactive ion etching (RIE method);

(3) a method in which an ultraviolet curable resin provided by doping a polymeric material with a photosensitive material is exposed and developed using photolithography (direct exposure method);

(4) a method utilizing injection molding; and (5) a method in which a core layer and a clad layer are applied, and a core part is thereafter exposed to change the refractive index of the core part (photo-bleaching method).

According to the above-mentioned methods of manufacturing a polymer optical wave guide, in general, a cutting process is performed using a dicing saw to form optical end faces after forming a core layer and a clad layer. At this time, a positioning mark (alignment mark) or positioning line formed in the optical waveguide is used as an index for setting alignment of the direction of cutting with the dicing saw or indicating the position to start cutting. An alignment mark is also used as a reference for positioning when an optical waveguide is optically coupled with another optical component. Referring to methods for such positioning, for example, an optical waveguide is optically coupled with an optical device such as a laser diode or photo-diode using techniques such as active aligning in which alignment is achieved by actually passing light between the elements and passive aligning in which alignment is alternatively be achieved using coordinates based on a positioning mark.

In general, a polymer optical waveguide of this type is restricted in that a refractive index difference between the clad and core cannot be great in order to optimize NA (a constant determined by the refractive indices of the core and the clad) which determines light propagation characteristics of the optical waveguide. For this reason, it is difficult to make a visual check on the amount and direction of any positional deviation of an alignment mark or positioning line to be used at the step of dicing an optical end face. As a result, the problem of difficulty in checking an alignment line mark or positioning line frequently arises during dicing not only when observing it with naked eyes but also when observing the alignment mark or the like with an existing image magnification apparatus. An alignment mark is also difficult to check with naked eyes when passive aligning is performed using coordinates, which results in an increase in the number of steps (time) of processing and consequently in a significant increase in manufacturing cost. The causes of such a problem include, for example, a small difference between the refractive indices of an alignment mark and a clad or core surrounding the same.

SUMMARY

According to an aspect of the invention, there is provided an optical waveguide comprising: a core for propagating light; a clad covering the core; and a line convex part extending along a line different from the core, the line convex part comprising a cavity used as a positioning mark inside the line convex part.

BRIEF DESCRIPTION OF THE DRAWINGS

Exemplary embodiments of the present invention will be described in detail based on the following figure, wherein.

DETAILED DESCRIPTION

Preferred embodiments of the invention will now be specifically described based on the accompanying drawings.

First Embodiment of the Invention (Configuration of Optical Waveguide)

Figure 1:
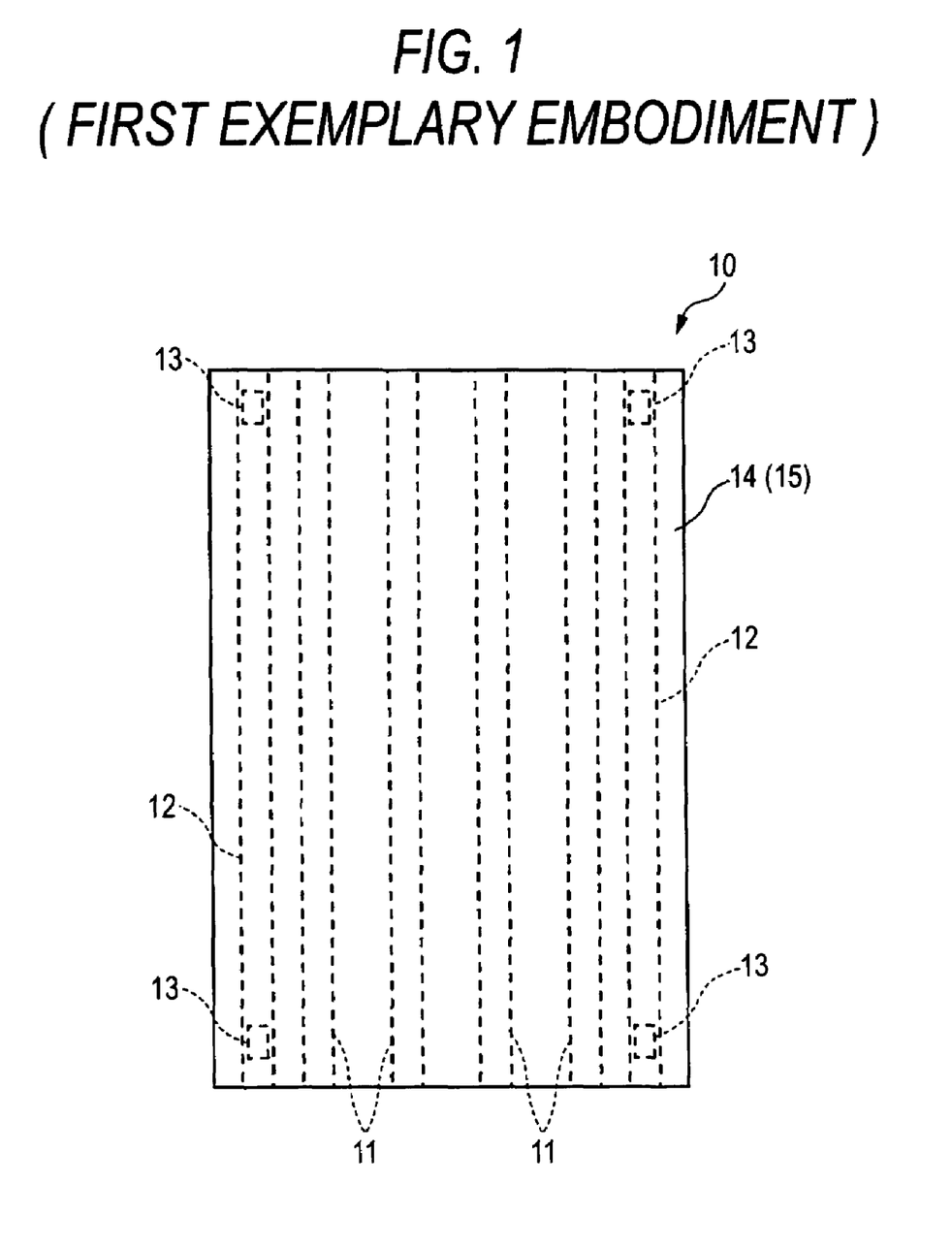
FIG. 1 is a plan view of an optical waveguide in a first embodiment of the invention schematically showing an example of a configuration of the same.

FIG. 1 is a plan view of an optical waveguide in a first embodiment of the invention, schematically showing an example of a configuration thereof.

In FIG. 1, reference numeral 10 represents an optical waveguide having a positioning mark and a positioning line. Referring to the basic configuration of the optical waveguide 10, as shown in FIG. 1, cores 11 in the form of an array, line convex parts 11 serving as positioning lines, and cavities 13 serving as positioning marks formed inside the line convex parts 12 are disposed between top and bottom clad substrates 14 and 15 having a refractive index lower than that of the cores 11 through which light propagates. In the illustrated example, the top and bottom clad substrates 14 and 15 are provided by forming, for example, a film material or sheet material in a rectangular shape. The cores 11 are four line structures extending at predetermined array intervals from one end face to another end face in the direction in which light travels.

As shown in FIG. 1, the line convex parts 12 are symmetrically disposed to sandwich the core array at intervals from smaller than the array intervals between the cores 11, and they constitute two line structures extending along the cores 11 between one end face and another end face in the direction in which light travels. The width and height of the line convex parts 12 are substantially equal to the width and height of the cores 11. A rectangular cavity 13 is formed on both ends of each line convex part 12 in the longitudinal direction thereof, and such a cavity 13 is disposed at each of four corners of the clad region. The height of the cavities 13 is substantially equal to the height of the cores 11.

The optical waveguide 10 (optical waveguide film 10) in the first embodiment of the invention is primarily characterized in that the line convex parts 12 to serve as positioning lines are formed in regions other than the cores 11 in the top and bottom clad substrates 14 and 15; the cavities 13 to serve as positioning marks are formed inside the line convex parts 12 in the top and bottom clad substrates 14 and 15; and a great refractive index difference is achieved between the cavity 13 and the cores 11 or the top and bottom clad substrates 14 and 15. When the adjustment of optical alignment (positioning) or the calculation of relative coordinates of alignment marks is carried out using the configuration having such characteristics, it is possible to perform an operation of cutting optical end faces of the optical waveguide 10 and an operation of optically coupling the optical waveguide and a photoelectric conversion element easily and accurately by visually checking or optically detecting positioning marks and positioning lines.

The optical waveguide 10 having the above-described configuration is not limited to the structure, shapes, and constituent members in the illustrated example. Although the material of the line convex parts 12 to serve as positioning lines may be freely selected and used, it is preferable to use the same material as that of the cores 11 from the viewpoint of the number of steps and utilization of the material. Further, the numbers, positions, sizes, and shapes of the cores 11 and the line convex parts 12 are not limited to those in the illustrated example and may be freely set.

Second Embodiment of the Invention (Configuration of Optical Waveguide)

Figure 2:
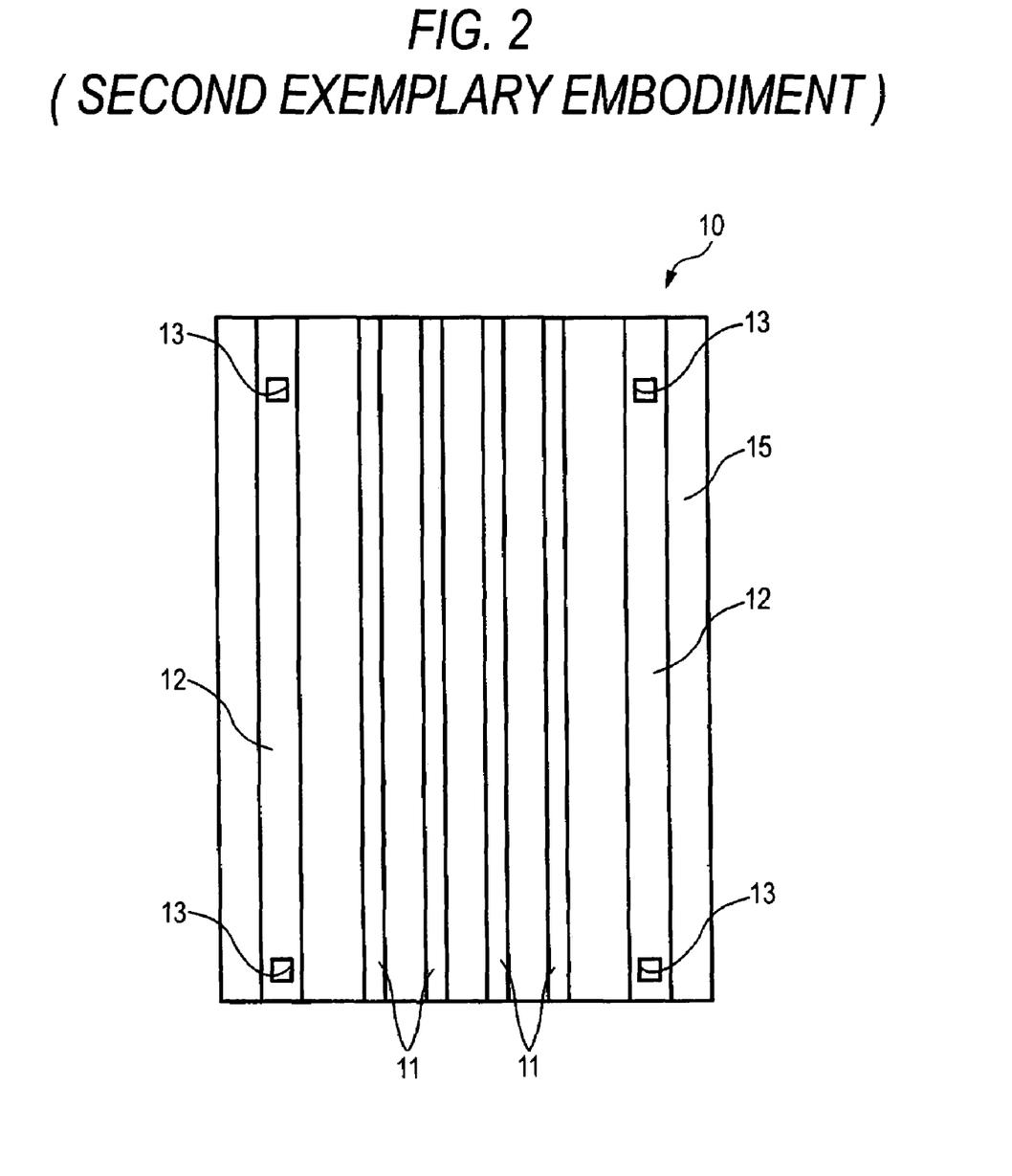
FIG. 2 is a plan view of an optical waveguide in a second embodiment of the invention schematically showing an example of a configuration of the same.

FIG. 2 is a plan view of an optical waveguide in a second embodiment of the invention schematically showing an example of a configuration of the same. FIG. 2 is significantly different from the first embodiment of the invention in that the width of the line convex parts 12 serving as positioning lines is set greater than the width of the cores 11 and in that the line convex parts 12 are formed on both ends in the widthwise direction of the core array at intervals greater than the array intervals of the cores 11. FIG. 2 omits the top clad substrate 14. In FIG. 2, members substantially identical to members in the first embodiment of the invention are indicated by like member designations and reference numerals. Therefore, such members will not be described in detail.

(Method of Manufacturing Optical Waveguide)

The optical waveguides 10 in the first and second embodiments of the invention having the above-described configurations can be efficiently manufactured as described below according to a manufacturing method according to the invention as shown in FIG. 3.

Figure 3A:
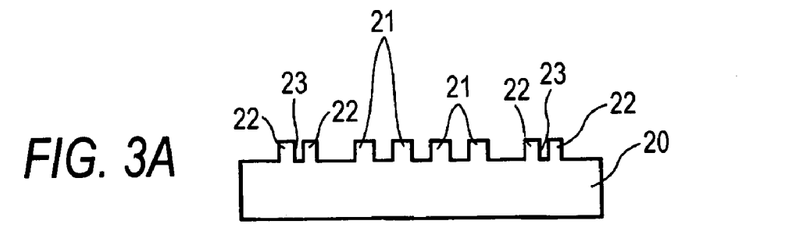
FIGS. 3A to 3G are flow charts conceptually showing steps for fabricating an optical waveguide according to the invention.
Figure 3B:
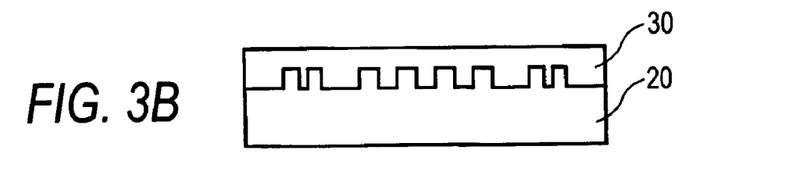
Figure 3C:
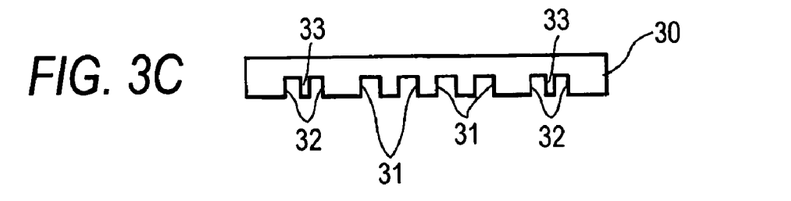
Figure 3D:
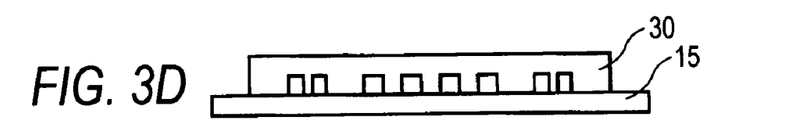
Figure 3E:
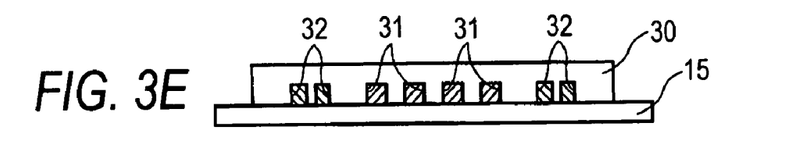
Figure 3F:
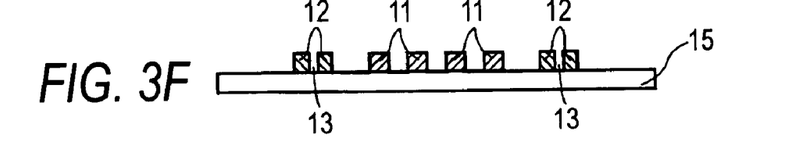
Figure 3G:
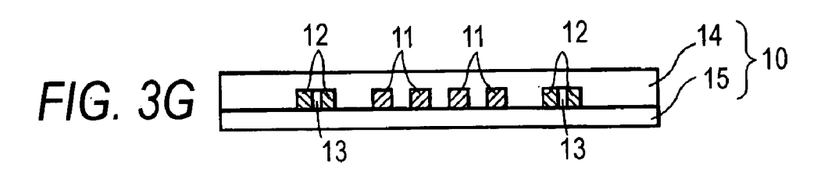

FIGS. 3A to 3G are conceptual illustrations of steps for fabricating an optical waveguide. FIGS. 3A to 3C are conceptual illustrations showing steps for fabricating a master for fabricating a mold and steps for fabricating the mold to be used for fabrication of cores. FIGS. 3D to 3F are conceptual illustrations showing steps for forming cores, line convex parts, and cavities on a bottom clad substrate, and FIG. 3G is a conceptual illustration showing steps for fabricating a clad on the bottom clad substrate and around the core. Although a method of manufacturing a linear optical waveguide will be addressed in this example of manufacture, the invention obviously include, for example, curved optical waveguides in its scope without being limited to the example. In this example of manufacture will address a case in which line convex parts to serve as positioning lines are formed on both ends of a core array in the widthwise direction thereof at intervals greater than array intervals of the cores just as in the optical waveguide shown in FIG. 2. However, the description applies to a case in which line convex parts are formed on both ends of a core array in the widthwise direction thereof at intervals smaller than array intervals of the cores just as in the optical waveguide shown in FIG. 1.

(Fabrication of Master)

As shown in FIG. 3A, a master 20 has convex parts 21 for core formation corresponding to the shape of cores, convex parts 22 for line formation corresponding to the shape of line convex parts, and concave parts 23 for cavity formation corresponding to the shape of cavities. For example, the master 20 may be fabricated using a photolithographic process in the related art. By way of example, the master 20 may alternatively be fabricated using a fabrication method employing an electro-deposition process or a photo-electrical deposition process disclosed in JP-A-2002-333538 or a master fabrication method disclosed on JP-A-2004-29507. The size of the convex parts 21 for core formation of the master 20 may be appropriately determined depending on the usage of the polymer optical waveguide. By way of example, it is common to use cores of about 10 μm square in a single mode optical waveguide and cores of about 50 to 100 μm square in a multi-mode optical waveguide. In some applications of polymer optical waveguides, however, optical waveguides having a greater core on the order of several hundred μm may be used. There is no particular limitation on the size of the convex parts 22 for line formation of the master 20. However, when the accuracy of a resultant mold is considered, the size is preferably 3 μm square. The size of the convex parts 21 for core formation and the convex parts 22 for line formation may be set regardless of the size of the concave parts 23 for cavity formation.

(Fabrication of Mold)

A mold may be fabricated, for example, using a method of fabrication that is substantially the same as the mold fabrication technique disclosed in JP-A-2004-29507 mentioned above. As shown in FIGS. 3A to 3C, a mold 30 is obtained by molding concave parts 31 for core formation, concave parts 32 for line formation, and convex parts 33 for cavity formation on a concave/concave forming surface of the master 20 thus fabricated by applying or casting a curable resin for mold formation on the surface. Net, vacuum defoaming is performed for about 10 minutes after leaving the mold as it is.

After performing a drying process as occasion demands, the curable resin for mold formation is cured. The curable resin layer thus cured is released from the master 20. Thus, a mold 30 constituted by a curable resin layer can be fabricated. It is desirable to perform a releasing process such as application of a release agent on the master 20 in advance to improve releasability of the master 20 and the mold 30.

The thickness of the curable resin layer may be appropriately determined in consideration to the ease of handling of the mold. For example, a proper thickness is in the range from about 0.1 mm to about 50 mm. Preferably, the mold may be formed with filling holes for filling the concave parts for core formation and the concave parts for line formation of the mold with the curable resin and discharge holes for discharging the curable resin from the concave parts for core formation and the concave parts for line formation, those cavities being formed in the concave parts for core formation and the concave parts for line formation. Concave parts corresponding to the shapes of the filling holes and the discharge holes may be provided on the master in advance. As an example of a simple method of fabrication, the filling holes and discharge holes may be formed by curing a curable resin layer made of the curable resin for mold formation on the concave/convex forming surface of the master, releasing the master from the curable resin layer thereafter, and cutting the mold such that both ends of the concave parts for core formation and the concave parts for line formation are exposed.

Preferably, the curable resin for mold formation has mechanical strength and dimensional stability of a certain degree or higher such that the mold can be easily released from the master and can be used repeatedly. It preferably has hardness sufficient to maintain the shape of the concave/convex forming surface and has high adhesion to the clad substrate. Various additives may be added to the curable resin for mold formation as occasion demands. From the viewpoint of releasability, mechanical strength, dimensional stability, hardness, and adhesion to the clad substrate, it is preferable to use a curable organopolysiloxane which becomes silicone elastomer or silicone resin when cured. The curable organopolysiloxane preferably includes a methylsiloxane group, an ethylsiloxane group, and a phenylsiloxane group in its molecule. The curable organopolysiloxane may be either single liquid type or two-liquid type which is used in combination with a stiffener. The resin may be either heat curable type or room temperature curable type, e.g., a resin which is cured by moisture in the air, and it may be cured using UV curing.

Liquid silicone rubbers include materials having high viscosity such as a pasty material, and a two-liquid type material to be used in combination with a stiffener is preferred. Among liquid silicone rubbers, additive types of liquid silicone rubber are preferred because they stiffen in a short time uniformly in both of surface and internal regions thereof without by-products and have high releasability and a low rate of contraction. Among liquid silicone rubbers, liquid dimethylsiloxane rubber is especially preferred in terms of adhesion, releasability, strength, and hardness. The viscosity of the liquid silicone rubber is preferably in the range from about 500 to about 7000 Pa·s to accurately duplicate the concave parts for core formation, the convex parts for line formation, and the concave parts for cavity formation from the master, to facilitate defoaming by suppressing inclusion of air bubbles, and to form a mold having a thickness of a few millimeters. More preferably, the viscosity is in the range from about 2000 to about 5000 Pa·s. A solvent for viscosity adjustment may be added to the curable resin.

Among curable organopolysiloxanes, liquid silicon rubber which becomes silicone rubber when cured has the capability of duplicating nano-structures and high releasability. A mold utilizing silicone rubber can accurately duplicate concave and convex shapes on the master and can preferably adhere to the clad substrate. As a result, the interface between the concave parts for line formation and the convex parts for cavity formation and the interface between the concave parts for core formation and the clad substrate can be quite preferably formed, and only concave parts formed between the mold and the clad substrate can be efficiently filled with the curable resin. Further, the clad substrate and the mold can be easily released from each other. The use of such a mold makes it possible to easily and quite accurately fabricate a polymer optical waveguide having line convex parts to serve as positioning lines and cavities to serve as positioning marks formed inside the line convex parts. When the curable resin layer of the mold has elasticity, parts other than the concave parts for line formation, the convex parts for cavity formation, and the concave parts for core formation constituted by the curable resin layer may be formed using another material having rigidity. In this case, the ease of handling of the mold can be improved.

It is advantageous that the mold has surface energy in the range from 10 dyn/cm to 30 dyn/cm and, more preferably, in the range from 15 dyn/cm to 24 dyn/cm from the viewpoint of adhesion to the clad substrate. The Shore rubber hardness of the mold is preferably in the range from 15 to 80 and, more preferably, in the range from 20 to 60 from the viewpoint of molding performance, the maintenance of the concave and convex shapes, and releasability. The surface roughness (root mean square (RMS) roughness) of the mold is preferably 0.2 μm or less and, more preferably, 0.1 μm or less from the viewpoint of molding performance.

The mold is preferably optically transmissive in the ultraviolet region and/or visible region. It is preferable that the mold is optically transmissive in the visible region for the following reasons. The mold can be easily positioned when it is bonded with the clad substrate. The process of filling the concave parts of the mold with the curable resin for core formation and the curable resin for line formation can be observed, and the completion of the filling process can therefore be easily confirmed. It is preferable that the mold is optically transmissive in the ultraviolet region because the curable resin for core formation and the curable resin for line formation are to be ultraviolet-cured through the mold when ultraviolet curable resins are used, and the mold preferably has a transmittance of 80% or more in the ultraviolet region (250 nm to 400 nm).

The step of bonding the mold with a bottom clad substrate will now be described.

A bottom clad substrate 15 is bonded with the mold 30 fabricated through the above-described steps. This process is shown in FIG. 3D.

Referring to the material of the bottom clad substrate, it is preferable to use a film material having optical characteristics such as a refractive index and light transmittance, mechanical strength, heat resistance, and flexibility in accordance with the usage of the material. For example, the film material maybe an acrylic resin (such as polymethyl methacrylate), an alicyclic acryl resin, a styrene type resin (such as polystyrene or styrene-acrylonitrile copolymer), an olefin type resin (such as polyethylene, polypropylene or ethylene-propylene copolymer), an alicyclic olefin resin, a vinyl chloride type resin, a vinylidene chloride type resin, a vinyl alcohol type resin, a vinyl butyral type resin, an acrylate type resin, a fluorine-containing resin, a polyester type resin (such as polyethylene terephthalate or polyethylene naphthalate), a polycarbonate type resin, cellulose diacetate, cellulose triacetate, an amide type resin (aliphatic resin or aromatic polyamide) an imide type resin, a sulfone type resin, a polyether sulfone type resin, a polyether ether ketone type resin, a polyphenylene sulfide type resin, a polyoxymethylene type resin or a mixture of such resins.

Alicyclic acrylic resins that can be used include, for example, products designated as OZ-1000 or OZ-1100 (manufactured by Hitachi Chemical Co., Ltd.) in which an aliphatic cyclic hydrocarbon such as tricyclodecan is introduced as an ester substituent. Other exemplary alicyclic olefin resins are a product having a norbornene structure as a principal chain thereof, a product having a norbornene structure as a principal chain and having a polar group such as an alkyloxycarbonyl group (or an alkyl group with 1 to 6 carbon atoms or cycloalkyl group) as a side chain. Among such alicyclic olefin resins, an alicyclic olefin resin having a norbornene structure as a principal chain and a polar group such as an alkyloxycarbonyl group as a side chain has excellent optical characteristics including a low refractive index (the refractive index is approximately 1.50 at which a sufficient refractive index difference can be provided between the core and the clad and high optical transmittance, and it is excellent in heat resistance. The material is therefore suitable for the fabrication of a polymer optical waveguide. When a liquid dimethylsiloxane rubber serving as the curable resin for mold formation and an alicyclic olefin resin for forming the bottom clad are used in combination, excellent adhesion is provided between the mold and the bottom clad substrate, and deformation of the concave/convex molding surface of the mold can be prevented. Further, even when the concave/convex molding surface of the mold has a very small sectional area (e.g., a rectangle of 10×10 μm)), the concave parts of the mold can be quickly filled with the curable resin utilizing capillarity.

The refractive index of the clad substrate is preferably smaller than 1.55 to maintain a sufficient refractive index difference from the core. More preferably, the refractive index is smaller than 1.53. A clad substrate obtained by coating a substrate with a thin film clad may be used. In this case, the flatness of the substrate can be improved. Further, even a material having a low level of transparency can be used because there is a high degree of birefringence.

A description will now be made on the step of filling the gap between the bottom clad substrate and the core forming concave parts of the mold with the curable resin for core formation, filling the gap between the bottom clad substrate and the concave parts for line formation with the curable resin for line formation, and curing the curable resin for core formation and the curable resin for line formation that fill the gaps.

At the step shown in FIG. 3E, the concave parts 31 for core formation are filled with the curable resin for core formation through the filling holes of the mold 30 utilizing capillarity, and any excess portion of the curable resin for core formation is discharged to the outside through the discharge holes of the mold 30. At the same time, the concave parts 32 for line formation is filled with the curable resin for line formation through the filling holes of the mold 30, and any excess portion of the curable resin for line formation is discharged to the outside through the discharge holes of the mold. Next, the curable resin for core formation and the curable resin for line formation filling the concave parts are cured with heat or light. When the filling of the concave parts 31 and 32 of the mold 30 with the curable resins for forming the line convex parts and the cores is promoted using capillarity, for example, it is desirable to provide a suction port in a predetermined position in communication with the interior of the concave parts 31 and 32 of the mold 30 to reduce the pressure in the entire suction system to about 0.1 to 200 Pa. In addition, it is advantageous to heat the curable resins for forming the core and the line convex parts introduced through the filling holes of the mold 30 to reduce the viscosity of the resins.

Resins such as radiation curable, electron beam curable, and heat curable resins may be used as the curable resins for forming the cores and the line convex parts. Among such resins, UV curable resins and heat curable resins are preferably used. A UV curable or heat curable monomer or oligomer or a mixture of the monomer and oligomer may be preferably used as a UV curable resin or heat curable resin. An epoxy type, polyimide type, or acryl type UV curable resin is preferably used as a UV curable resin. The line convex parts serving as positioning lines must be similar in characteristics to the cores which are waveguides, the convex parts are preferably formed simultaneously with the cores using the same material as the cores. This is preferable from the viewpoint of the utilization of the material, the number of processing steps, and the fabrication cost. In order to fill the concave parts of the mold formed between the mold and the bottom clad substrate with the curable resin utilizing capillarity, the curable resin preferably has viscosity in the range from 10 to 2000 mPa·s. The viscosity is more preferably in the range from 20 to 1000 mPa·s and is still more preferably in the range from 30 to 500 mPa·s.

In order to allow accurate transfer of the shape of the master having the core formation convex parts corresponding to the shape of the cores, the line forming convex parts corresponding to the shape of the line convex parts, and the cavity forming concave parts corresponding to the shape of the cavities, it is important to keep the change in the volume of the mold small at the time of curing of the same. The change in the volume of the curable resin for forming the mold is preferably 10% or less and, more preferably, 6% or less. Thus, deformation of the concave parts of the mold as a result of the change in the volume of the mold can be suppressed, which makes it possible to prevent promotion of any positioning error. It is preferable to avoid the use of a solvent for reducing the viscosity of the curable resin for forming the mold because the solvent will increase the change in the volume of the mold at the time of curing.

A polymer may be added to the curable resins for forming the cores and the line convex parts in order to suppress the change (contraction) of the volume of the resins when they are cured. Preferably, the polymer has compatibility with the curable resins for forming the core and the line convex parts and does not have adverse effect on the refractive indices, elastic moduli, and the transmittance characteristics of the curable resins for forming the cores and the line convex parts. The addition of the polymer makes it possible to suppress the change in the volume of the resins and also makes it possible to control the viscosity and glass transition points of the curable resins. For example, an acryl type, methacrylic acid type, or epoxy type polymer is used, but the invention is not limited to them.

The refractive index of the curable resin for forming the cores after it is cured must be greater than that of the clad material. For example, the refractive index of the curable resin for forming the cores is 1.50 or more and, preferably, 1.53 or more. There is a refractive index difference of 0.01 or more and, preferably, 0.03 or more between the clad material and the cores. There is no limitation on the refractive index of the curable resin for forming the line convex parts in achieving the object of the invention. An ultraviolet curable resin is cured using an ultraviolet lamp, ultraviolet LED, or UV irradiation apparatus. A heat curable resin is cured by heating it in an oven.

A description will be made on the step of releasing the mold and the bottom clad substrate from each other.

At the step shown in FIG. 3F, the curable resin in the concave parts 31 and 32 of the mold 30 is cured, and the mold 30 is thereafter released from the bottom clad substrate 15.

A description will now be made on the step of forming an uncured clad material on the bottom clad substrate such that the cavities remain in an atmosphere including a gas to be confined in the cavities.

At the step shown in FIG. 3G, a clad material 14 is formed on side surfaces and top surfaces of the cores 11 on the bottom clad substrate 15 and side surfaces and top surfaces of the line convex parts 12 such that the cavities 13, which are open at the top side thereof to serve as positioning marks, will remain unfilled. A preferable technique for applying the clad material 14 on the bottom clad substrate 15 so as to leave the cavities 13 is to use a curable resin having high viscosity as the clad material 14. Specifically, a non-solid clad (uncured clad material) is applied to the side surfaces and top surfaces of the cores 11 to confine a gas in the cavities 13, and a curable resin having high viscosity is preferably used to prevent the clad material 14 from entering the cavities 13. For example, the viscosity of such a curable resin is preferably in the range from 30 to 3000 mPa·s when trade-off for productivity is considered and, more preferably in the range from 100 to 2000 mPa·s from the viewpoint of yield.

Resins such as ultraviolet curable resins and heat curable resins may be preferably used as the curable resin for forming the clad material. For example, a UV curable or heat curable monomer or oligomer or a mixture of the monomer and oligomer is preferably used as such a UV curable resin or heat curable resin. In order to suppress the change (contraction) of the volume of the curable resin for clad formation when it is cured, the curable resin for forming the bottom clad may be added with a polymer which has compatibility with the curable resin and does not have adverse effect on the refractive index, elastic modulo, and the transmittance characteristics of the curable resin, e.g., a methacrylic acid type or epoxy type polymer.

For ease of manufacture, it is preferable to use a gas which exits in the environment of the fabrication of the waveguide as the gas to be confined in the cavities 13. For example, the air surrounding the bottom clad substrate 15 is most conveniently used as the gas to be confined in the cavities 13, and the use of air is most desirable in terms of cost. Since the atmosphere at this processing step becomes a medium in the cavities as it is, the uncured clad material can be formed on the bottom clad substrate 15 in the atmosphere that is air.

In the case of a waveguide film having cavities, when the gas remaining in the cavities undergoes thermal expansion as a result of a heating process on the film material, there may be exfoliation of the film material, the core, and the clad, an increase or decrease in the waveguide width, deformation of the core, and displacement of core intervals. In order to avoid the influence of the thermal expansion of the gas confined in the cavities, it is desirable to eliminate the cavities serving as positioning marks for dicing by cutting them off, for example, at the same time when dicing is performed. Another exemplary solution is to produce vacuum in the cavities, which is however unpreferable because an expensive vacuum apparatus is required and the number of steps is increased. Further, vacuum process in a suction system is unpreferable from the viewpoint of cost and the number of steps when no heating process is required for the film material. When relative coordinates of positioning marks are calculated, the marks must remain at the time of positioning. Then, the cavities may be partially cut at the time of dicing to open the cavities, which makes it possible to avoid the influence of the thermal expansion of the gas confined in the cavities.

In order to suppress the change (contraction) of the volume of the ultraviolet curable or heat curable resin for clad formation when it is cured, the resin may be added with a polymer similar to the polymer added to the bottom clad substrate. The refractive index of the clad layer is preferably 1.55 or less to maintain a sufficient refractive index difference from the core. More preferably, the refractive index is 1.53 or less. The refractive index difference between the clad substrate and the clad layer is preferably as small as possible. The difference is 0.05 or less and is more preferably 0.001 or less. Further, it is desirable that there is no such difference from the viewpoint of confinement of light.

A description will now be made on the step of curing the clad material to confine the gas in the cavities.

The gas in the cavities 13 can be confined by curing the uncured clad material with heat or light after forming the uncured clad material on the bottom clad substrate 15 with the cavities 13 unfilled in the atmosphere including the gas to be confined in the cavities 13. When an ultraviolet curable resin is to be cured, an ultraviolet lamp, ultraviolet LED, or UV irradiation apparatus is used. When a heat curable resin is to be cured, it is heated in an oven.

Line convex parts 12 having cavities 13 to serve as positioning marks can be effectively formed on the bottom clad substrate 15 through the above-described steps. The formation of the line convex parts 12 is not limited to the above-described method of manufacture and, for example, a direct exposure process or etching process may alternatively be employed. However, the use of the above described manufacturing method is preferred to achieve a reduction in the fabrication cost and a reduction in the number of steps.

The step of cutting ends of the optical waveguide will now be described.

Both end faces of the optical waveguide 10 in the longitudinal direction thereof may be cut at right angles or obliquely with a dicing saw, and a flexible polymer optical waveguide 10 can be thus formed. The cavities 13 serving as positioning marks can be cut and eliminated at the same time when dicing is performed, and part of the cavities 13 can be formed into concaves that open at the cut end faces of optical waveguide 10. Entire target cutting lines can be determined based on the concaves which are open parts of the cavities 13. Obviously, the cutting of both end faces of the optical waveguide 10 is not limited to the cutting method utilizing a dicing saw.

A description will now be made on a filling method utilizing capillarity and/or pressure-reducing evacuation.

In order to promote the filling of the concave parts 31 and 32 of the mold 30 with the curable resin utilizing capillarity, suction ports are provided in predetermined positions in communication to the interior of the concave parts 31 and 32 of the mold 30 to reduce the pressure of the entire suction system, which allows efficient manufacture. At the step shown in FIG. 3E, as shown in FIGS. 10A to 10C, capillarity is used to cause an uncured curable resin to naturally spread toward a suction port 35, and pressure-reducing evacuation is performed at the suction port 35 to forcibly spread the uncured curable resin toward the suction port 35.

Figure 10A:
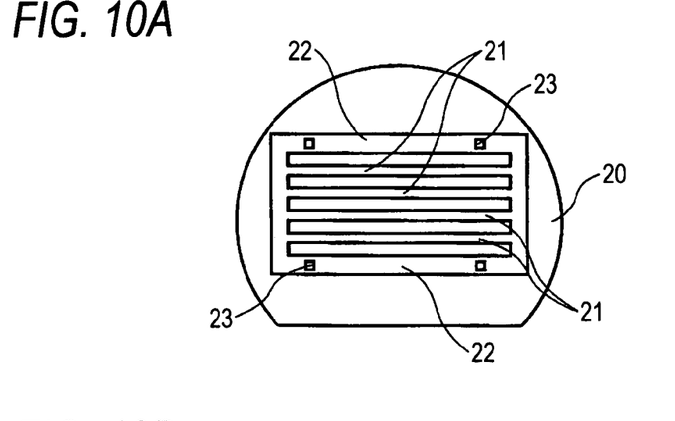
FIGS. 10A to 10C are flow chart conceptually showing steps for fabricating an optical waveguide that is Example 2 of the invention.
Figure 10B:
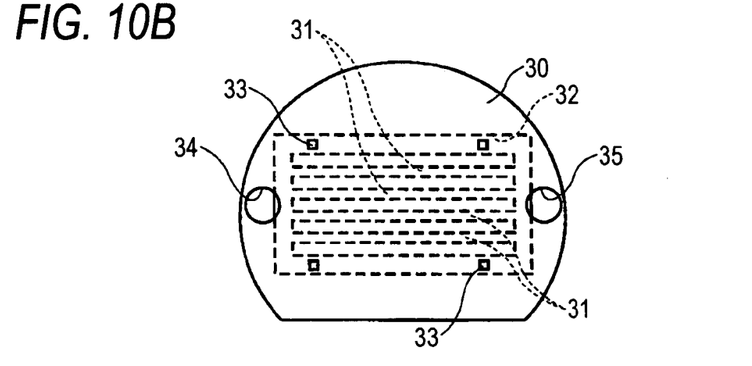
Figure 10C:
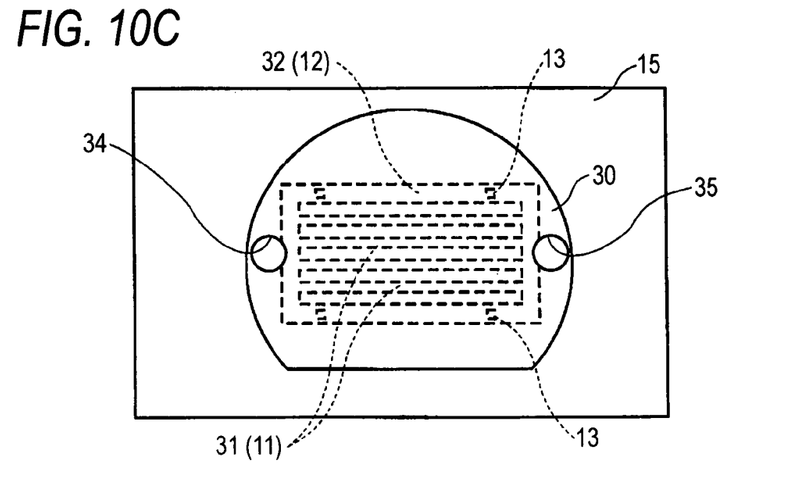

As shown in FIGS. 10A to 10C, two ore more filling holes 34 and discharge holes 35 (through holes 34 and 35) for filling and discharging the curable resin for core formation and the curable resin for line formation maybe provided at one and another end of the concave parts 31 and 32 of the mold 30. The curable resins are introduced into through holes 34 provided at one end of the concave parts 31 and 32 of the mold 30, and pressure-reducing evacuation is performed at through holes 35 provided at another end of the concave parts 31 and 32 of the mold 30. Thus, the concave parts 31 and 32 of the mold 30 can be filled with the curable resins. The mold 30 is filled with the curable resins by performing pressure-reducing evacuation through the through holes 34 and 35, the filling speed of the curable resins can be increased, and the adhesion between the mold 30 and the bottom clad substrate 15 can be improved. It is also possible to prevent inclusion of air bubbles.

The mold 30 is provided with three each through holes 34 and 35 in the case of a branching waveguide having, for example, three branches and provided with nine each through holes in the case of a branching waveguide for 1:8 branching. Thus, branching waveguides connected into a multiplicity of stages can be accommodated. The through holes 34 provided on the filling hole side of the mold 30 serve as liquid reservoirs. The through holes 35 provided on the discharge hole side of the mold 30 can be used as pressure-reducing evacuation hole for reducing the pressure in the concave parts 31 and 32 of the mold 30 when the mold is filled with the curable resins. There is no particular limitation on the shape and size of the through holes 34 on the filling hole side of the mold 30 as long as the through holes 34 are in communication to the entrance ends of the concave parts 31 and 32 of the mold 30 and have the function of liquid reservoirs. There is no particular limitation on the shape and size of the through holes 35 on the discharge hole side of the mold 30 as long as the through holes 35 are in communication to the discharging ends of the concave parts 31 and 32 of the mold 30 and can be used for pressure-reducing evacuation.

As described above, the through holes 34 provided on the filling hole side of the mold 30 have the function of liquid reservoirs. Therefore, the through holes 34 may be formed such that its section area is greatest at the side thereof contiguous with the bottom clad substrate 15 and gradually becomes smaller, the further the bottom clad substrate 15 becomes, when the mold 30 is bonded with the bottom clad substrate 15. As a result, the mold 30 and the bottom clad substrate 15 can be easily released from each other after the concave parts 31 and 32 of the mold 30 are filled with the curable resins. Since the through holes 35 provided on the discharge hole side of the mold are not required to have the function of liquid reservoirs, those holes are not required to have a sectional structure like that of the through holes 34 provided on the filling hole side of the mold 30.

Referring to molding, for example, a mold having the concave parts for core formation corresponding to the shape of the cores, the concave parts for line formation corresponding to the shape of the line convex parts, and the convex parts for cavity formation corresponding to the shape of the cavities may be formed, and the through holes may be formed by punching part of the mold into a predetermined shape. The punching may be performed such that the filling holes for filling the mold with the curable resin for core formation and the discharge holes for discharging the curable resin for core formation from the concave parts will appear in the through holes. Preferable adhesion is achieved between the mold and the bottom clad substrate, and no void is formed between the mold and the bottom clad substrate except for the concave parts of the mold. Therefore, no penetration of the curable resins occurs except for the concave parts of the mold. The through holes are not limited to the type that is obtained by removing the curable resin layer entirely in the direction of the thickness of the mold (punched type), and the through holes may be formed such that part of the mold will remain in the direction of the thickness of the mold. In this case, the mold is disposed such that the through holes are exposed under the bottom clad substrate.

The master may be provided with not only the convex parts for core formation corresponding to the shape of the cores, the convex parts for line formation corresponding to the shape of the line convex parts, and the concave parts for cavity formation corresponding to the shape of the cavities but also convex parts for forming the through holes (the height of the convex parts is greater than the thickness of the curable resin layer constituted by the curable resin for mold formation when the through holes are of the punched type). A method may be employed in which the curable resin layer for mold formation is applied to the master such that the layer is pierced by the convex parts for forming the through holes or such that the convex parts are covered, and the curable resin layer is then cured to release the curable resin layer from the master. For example, the technique disclosed in JP-A-2006-17885.

Advantages of the First Embodiment of the Invention

The following advantages can be achieved by the first embodiment of the invention.

(A) A great refractive index difference can be provided between the cavities serving as the positioning marks and the cores or clad material. It is therefore possible to accurately detect the positioning lines and positioning marks by visually checking or optically detecting the amount and direction of any positional deviation with reference to the positioning marks.

(B) Since the cores, the clads, and the line convex parts are formed from curable polymeric materials, a gas in the cavities can be easily confined.

(C) The cavities can be opened by cutting the cavities serving as positioning marks at the same time when dicing is performed. Thus, it is possible to prevent the occurrence of exfoliation of the core and clads, deformation of the cores, and displacement of core intervals attributable to thermal expansion of the gas confined in the cavities. Since entire target cutting lines can be determined based on the concave parts provided by opening part of the cavities, it is possible to accurate perform an operating of cutting optical end faces of the optical waveguide and an operation of optically coupling the optical waveguide with another optical component.

(D) When the cavities to serve as positioning marks are formed, the cores and the positioning marks can be simultaneously formed at the same step. It is therefore possible to manufacture the optical waveguide easily at a low cost.

(E) Since the accuracy of relative positions of the positioning marks and the cores can be determined by the accuracy of the mold, there will be quite small deviations, and the cavities to serve as positioning marks can be accurately formed.

Modifications of the cavities to serve as positioning marks will now be described with reference to FIGS. 4 to 8. Those figures are significantly different from the above-described first embodiment of the invention in that a plurality of cavities to serve as positioning marks are intermittently formed in a line convex part to serve as a positioning line. In those figures, members substantially identical to members in the first embodiment of the invention are therefore indicated by like member designations and reference numerals.

(Modification 1)

Figure 4:
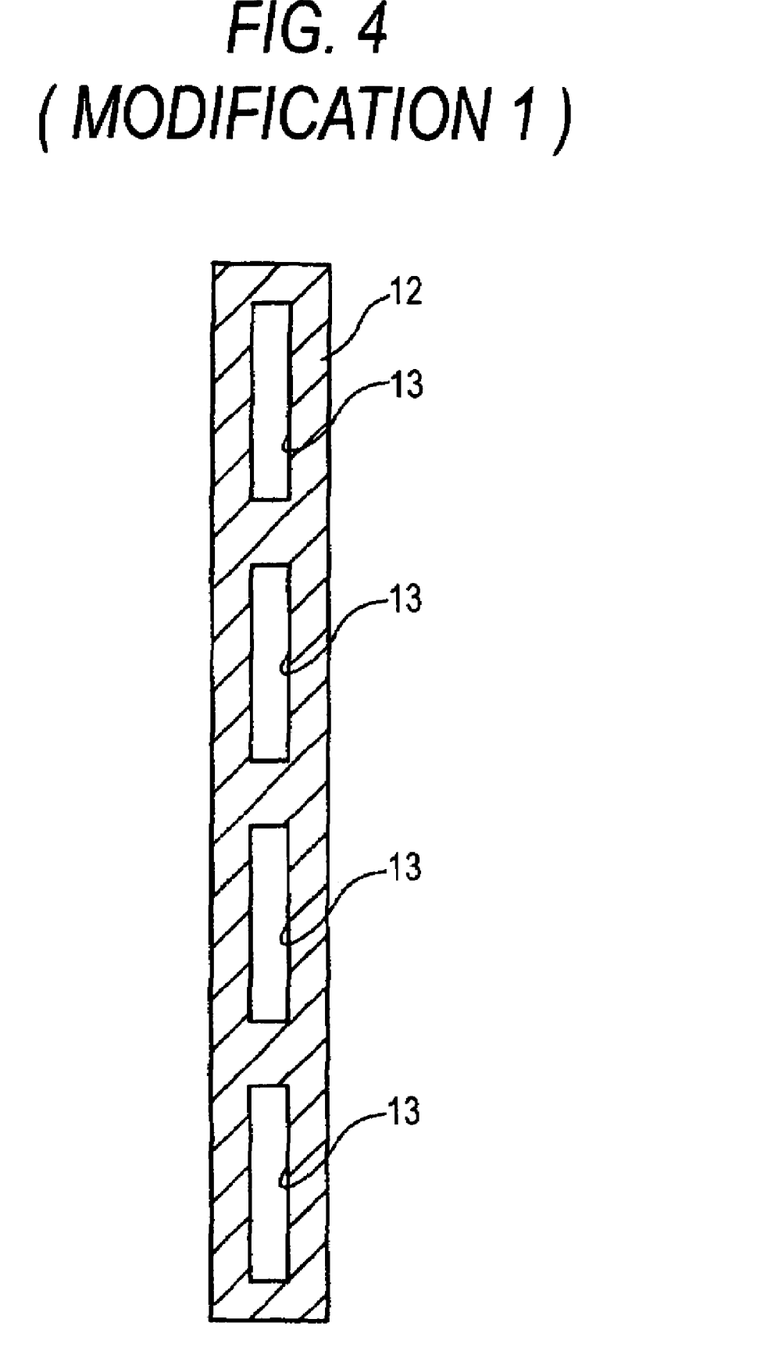
FIG. 4 schematically shows a modification of positioning marks of an optical waveguide.

FIG. 4 schematically shows a modification of cavities to serve as positioning marks in an optical waveguide, and it is an end view of a line convex part to serve as a positioning line taken from above the same.

In FIG. 4, a plurality of cavities 13 to serve as positioning marks are intermittently formed in the line convex part 12 to serve as a positioning line. The cavities 13 are in the form of rectangles which are long in the lengthwise direction of the line convex part 12 and are disposed at equal intervals in the convex part. The height of the cavities 13 is substantially equal to the height of a core 11. Since the plurality of cavities 13 are intermittently provided in the line convex part 12, alignment can be easily adjusted when dicing is performed.

(Modification 2)

Figure 5:
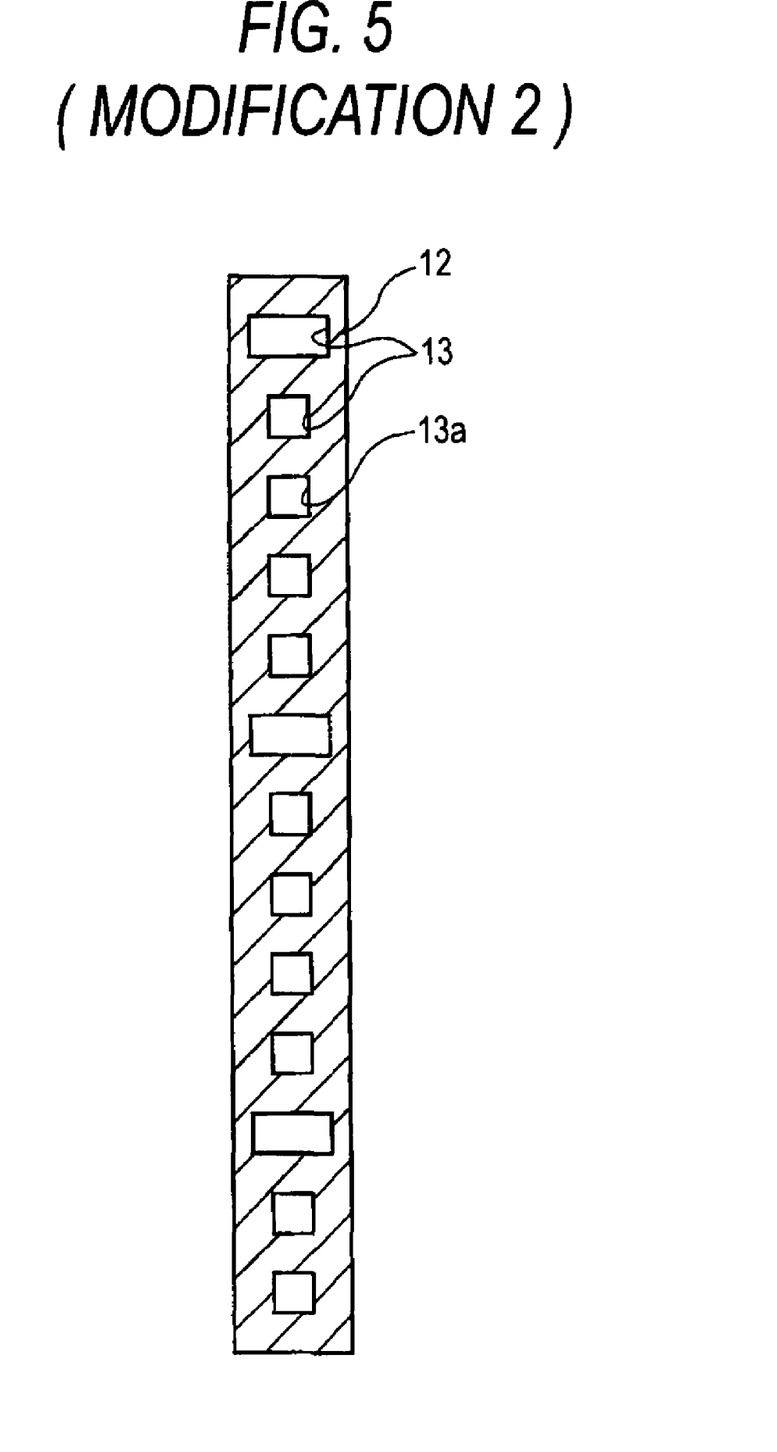
FIG. 5 schematically shows another modification of positioning marks of an optical waveguide.

FIG. 5 schematically shows another modification of cavities to serve as positioning marks in an optical waveguide, and it is an end view of a line convex part to serve as a positioning line taken from above the same.

Referring to FIG. 5, in a line convex part 12 to serve as a positioning line, cavities 13 in the form of rectangles which are long in the width direction of the convex part and square cavities 13a are regularly disposed at equal intervals. The height of the cavities 13 and 13a is substantially equal to the height of a core 11. Since the cavities 13 and 13a having different shapes are formed at regular intervals in the line convex part 12, the cavities can serve as a scale, and positioning can be performed with length information involved.

(Modification 3)

Figure 6:
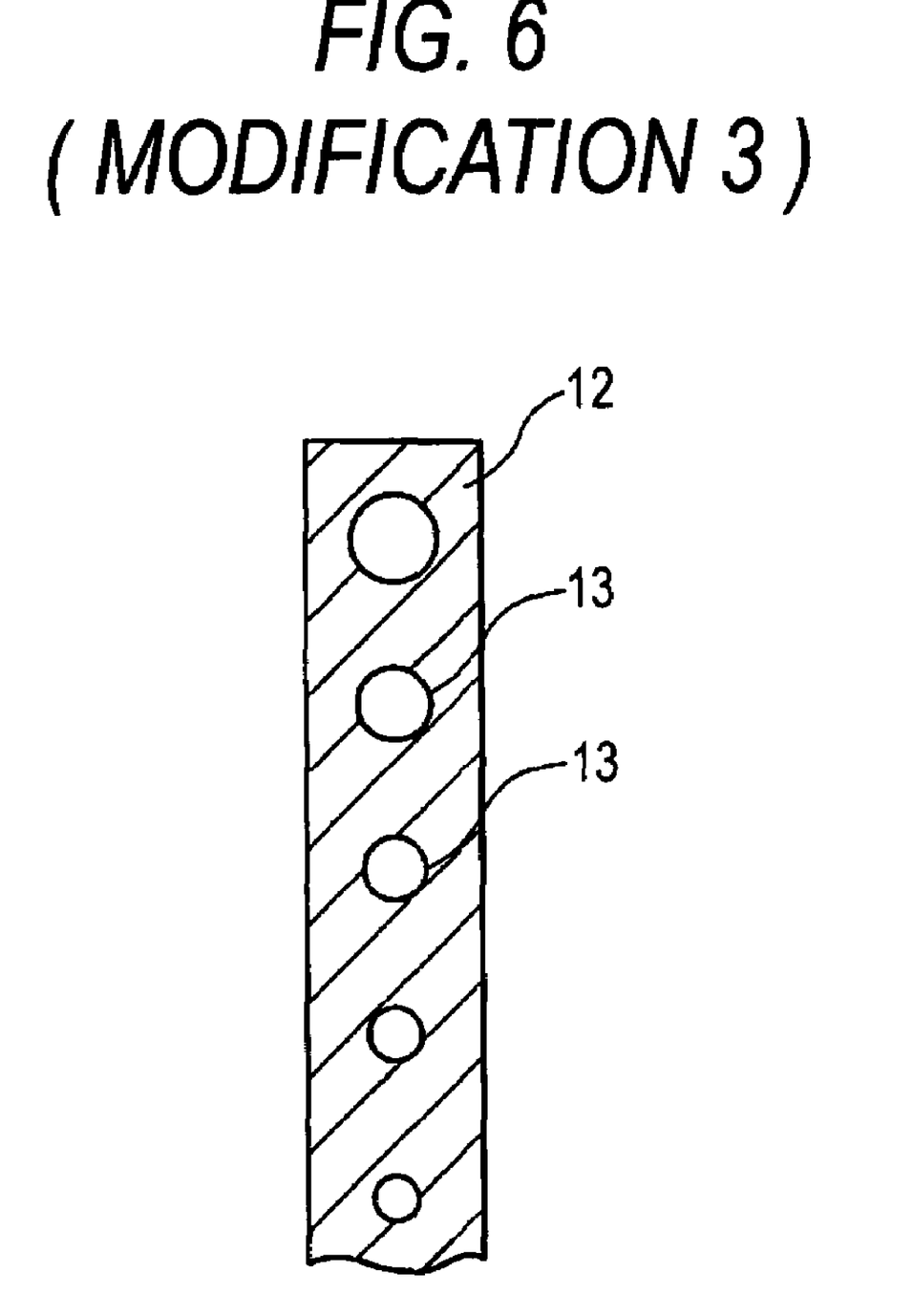
FIG. 6 schematically shows still another modification of positioning marks of an optical waveguide.

FIG. 6 schematically shows still another modification of cavities to serve as positioning marks in an optical waveguide, and it is a partial end view of a line convex part to serve as a positioning line taken from above the same.

In FIG. 6, a plurality of circular cavities 13 having various diameters to serve as positioning marks are formed in a line convex part 12 to serve as a positioning line. The cavities 13 are disposed such that the diameter of the cavities gradually decreases in the lengthwise direction of the convex part, and they may be formed at equal intervals in the line convex part 12. The height of the cavities 13 is substantially equal to the height of a core 11. Since the cavities 13 whose diameter gradually decreases in the direction of the lengthwise direction of the line convex part 12 are disposed in the line convex part 12, positioning can be performed with position information involved. In particular, when alignment is adjusted prior to cutting using a dicing saw, position information of an alignment mark in the film can be obtained when the mark is observed with an existing image magnification apparatus. Thus, the adjustment of alignment is facilitated.

(Modification 4)

Figure 7:
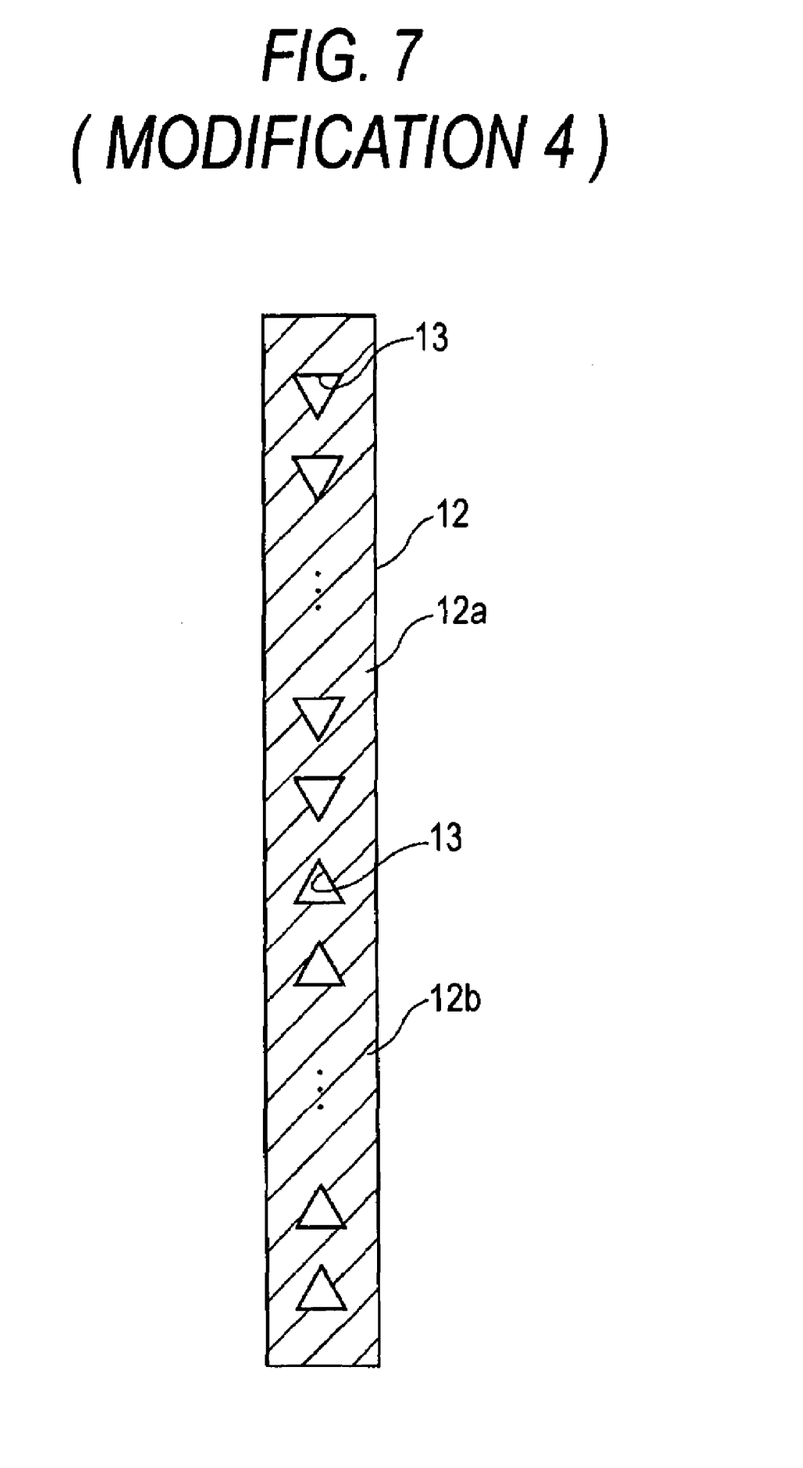
FIG. 7 schematically shows still another modification of positioning marks of an optical waveguide.

FIG. 7 schematically shows still another modification of cavities to serve as positioning marks in an optical waveguide, and it is an end view of a line convex part to serve as a positioning line taken from above the same.

Referring to FIG. 7, a line convex part 12 to serve as a positioning mark is divided into two parts, i.e., first and second distribution areas 12a and 12b. In the first distribution area 12a, a plurality of triangular cavities 13 are formed such that a vertex of each triangle points toward the center of the line convex part 12. In the second distribution area 12b, a plurality of triangular cavities 13 are formed such that a vertex of each triangle points oppositely to the cavities 13 in the first distribution area 12a. The height of the cavities 13 is substantially equal to the height of a core 11. Since the cavities 13 pointing in different directions in the respective areas 12a and 12b are disposed in the line convex part 12, positioning can be performed with area information involved. In particular, when alignment is adjusted prior to cutting using a dicing saw, rough positional information of an alignment mark in the film can be obtained when the mark is observed with an existing image magnification apparatus. Thus, the adjustment of alignment is facilitated. The number, positions, sizes, and shapes of positioning marks may be freely set without being limited to those in the illustrated example, and positioning marks can be designed with great flexibility.

(Modification 5)

Figure 8:
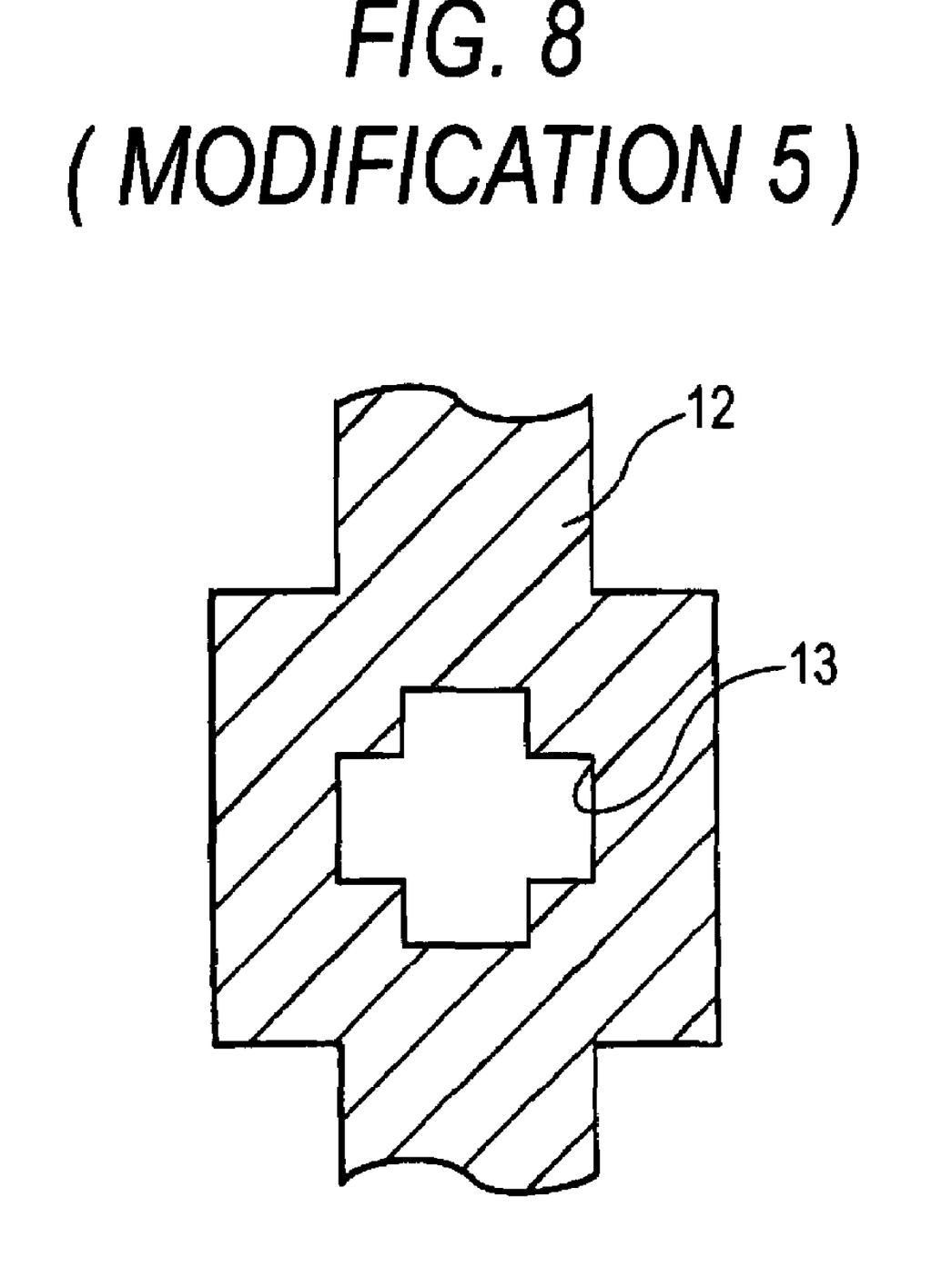
FIG. 8 schematically shows still another modification of positioning marks of an optical waveguide.

FIG. 8 schematically shows still another modification of cavities to serve as positioning marks in an optical waveguide, and it is a partial end view of a line convex part to serve as a positioning line taken from above the same.

Referring to FIG. 8, a line convex part 12 to serve as a positioning mark has a positioning mark forming region formed in a square shape having an expanded width. A cavity 13 to serve as a positioning mark is formed like a cross in the square region having an expanded width. The width of the cavity 13 is set at the same dimension as the width of the line convex part 12. The height of the cavity 13 is substantially equal to the height of a core 11. Since the crossed cavity 13 is provided in the square region of the line convex part 12 having an expanded width, alignment can be more easily adjusted when dicing is performed.

Specific examples of the invention will now be described with reference to FIGS. 9 and 10.

Figure 9:
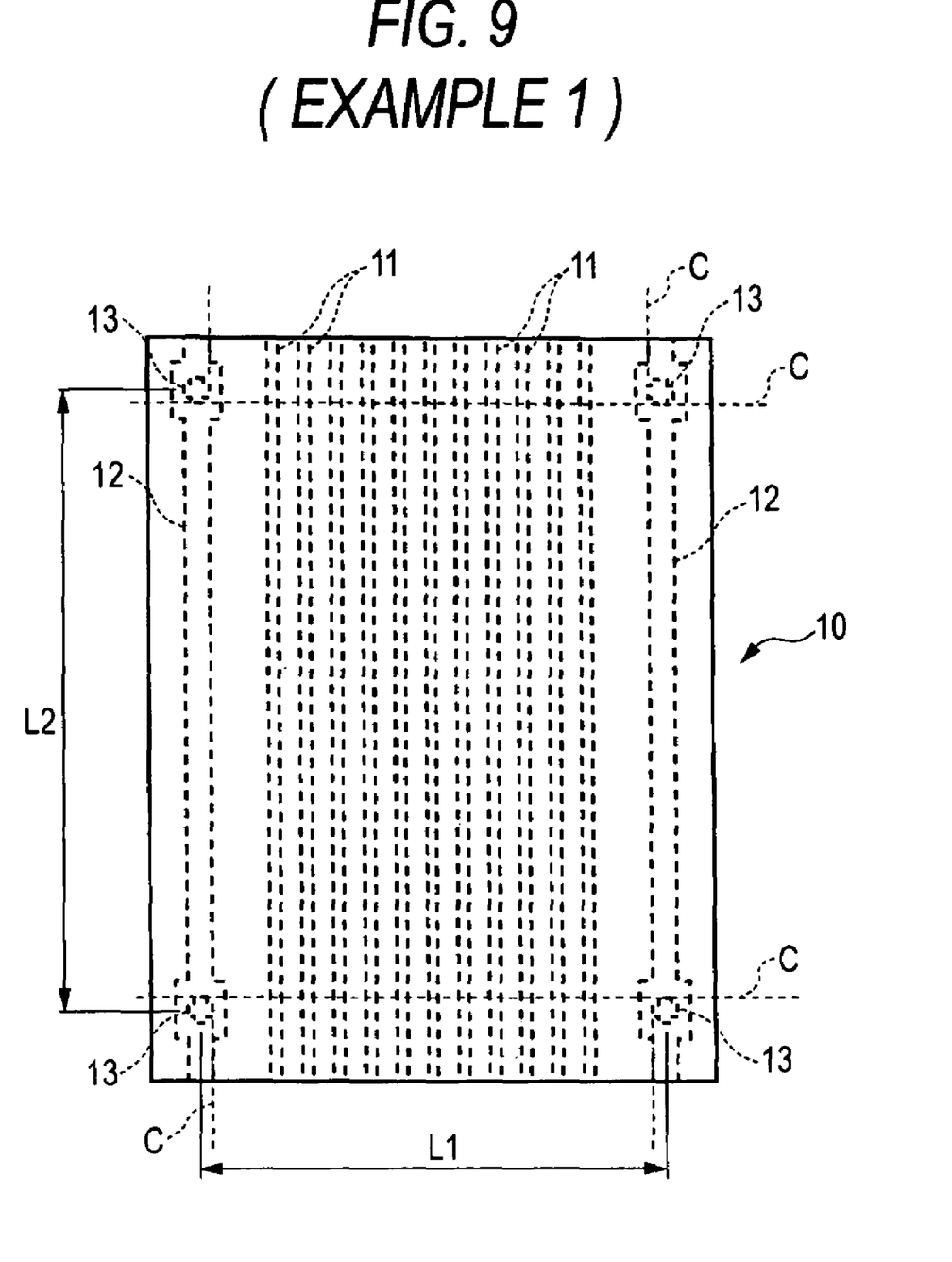
FIG. 9 is a plan view of an optical waveguide that is Example 1 of the invention, schematically showing an example of a configuration of the same.

FIG. 9 is a plan view of an optical waveguide according to example 1 of the invention schematically showing an example of a configuration of the same. FIG. 9 is different from, the first embodiment of the invention in that the width of positioning lines is expanded in regions where positioning marks are formed. Therefore, members in the figure substantially identical to members in the first embodiment of the invention are indicated by like member designations and reference numerals.

EXAMPLE 1

FIG. 9 shows a state of an optical waveguide film before circumferential end faces of the optical waveguide film are cut. As shown in FIG. 9, a waveguide film 10 having a length of 70 mm and including cores 11 having a refractive index of 1.53 and top and bottom clad materials 14 and 15 having a refractive index of 1.51 is fabricated. Line convex parts 12 having cavities 13 to serve as positioning marks are formed from the same material at the same time as the cores 11. The eleven cores 11, . . . 11 forming an array are 50 μm square each. Each of the two line convex parts 12, 12 had a width of 100 μm and a height of 50 μm. The two line convex parts 12, 12 are symmetrically disposed so as to sandwich the cores 11 in the form of an array. A center distance L1 between the cavities 13 of the two line convex parts 12 is 5.1 mm, and a center distance L2 between the cavities 13 on both ends of the line convex parts 12 in the longitudinal direction thereof is 60.1 mm. The positioning mark forming regions of the line convex parts 12 having an expanded width are formed in a square shape, and the cavities 13 to serve as positioning marks are formed like crosses. A cutting process is performed using a dicing saw with a blade having a cutting width of 100 μm along the dotted line C in FIG. 9 such that the positioning marks would not remain, the positioning mark being used as a reference for positioning. Thus, a waveguide film having a length of 60.0 mm and a width of 5.0 mm is completed. Since the positioning marks are constituted by the cavities 13, the positioning marks could be easily recognized, and dicing could be performed in a short time.

EXAMPLE 2

FIGS. 10A to 10C are conceptual illustrations of steps for fabricating an optical waveguide. FIG. 10A is a conceptual illustration of a step for fabricating a master for the fabrication of a mold. FIG. 10B is a conceptual illustration of a step for fabricating a mold for the fabrication of cores. FIG. 10C is a conceptual illustration of a step for forming cores, line convex parts, and cavities on a bottom clad substrate.

(Fabrication of Master)

A thick resist is applied to a Si substrate 20, which is a master, using a spin coat process, pre-baked at 80° C. thereafter, and exposed and developed through a photo-mask. Thus, convex parts 22 for line formation corresponding to the shape of line convex parts and concave parts 23 for cavity formation corresponding to the shape of cavities are formed (core width is 50 μm and cavity width is 50 μm). The master 20 thus fabricated is post-baked at 120° C. to complete the master 20 as shown in FIG. 10A. Positioning mark forming regions of the line convex parts are in the form of squares having an expanded width, although not shown.

Next, as shown in FIG. 10B, a release agent is applied to the master 20, and a heat curable dimethylsiloxane resin (SYLGARD184 manufactured by DOW CORNING ASIA LTD.) is introduced. The resin is left as it is for a certain time, subjected to vacuum defoaming for about 10 minutes thereafter, and heated for 30 minutes at 120° C. to be cured. Thereafter, the master 20 is released to obtain a mold 30 having concave parts 32 for line formation, convex parts 33 for cavity formation, and concave parts 31 for core formation. A hole having a diameter of 3 mm is formed in each of two locations on a line connecting a concave part 32 for line formation, a convex part 33 for cavity formation, and a concave part 31 for core formation, thereby forming a filling hole 34 and a suction hole 35. In Example 2, the line convex parts 12 and the cores 11 are formed from the same material. When the line convex parts 12 and the cores 11 are obtained by filling the mold with different materials, it is obvious that a filling hole and a suction hole in communication with each of the line forming concave parts 32 and the core forming concave parts 31 may be provided.

(Fabrication of Waveguide)

Next, as shown in FIG. 10C, the mold 30 is bonded with a film substrate (bottom clad substrate) 15 (ARTON film having a refractive index of 1.51 manufactured by JSR Corp.) having a thickness of 188 μm. Then, the filling hole 34 formed on the mold 30 is sufficiently filled with an ultraviolet curable resin having a viscosity of 800 mPa·s (having a refractive index of 1.54 when cured), and the resin is absorbed through the suction hole 35 using a suction pump which is not shown. As a result, the concave parts 32 for line formation and the concave parts 31 for core formation are filled with the ultraviolet curable resin with the cavities 13 left unfilled. Then, the resin is cured by irradiating it with ultraviolet light of 50 mW/cm$^2$ for 5 minutes through the mold 30 (made of dimethylsiloxane resin). Thereafter, the mold 30 is released to form the line convex parts 12 having the air cavities 13 and the cores 11 on the film substrate 15 and it is cured by irradiating with ultraviolet light of 50 mW/cm$^2$. An ultraviolet curable resin for cladding having viscosity of 730 mPa·s and a refractive index of 1.51 is applied around the line convex parts 12 having the air cavities 13 and the cores 11 on the film substrate 15. Finally, alignment is adjusted using the positioning marks, and ends of the optical waveguide are cut using a dicing saw to form the ends of the optical waveguide. An optical waveguide film 10 having dicing marks constituted by cavities 13 confining air is fabricated through the above-described steps.

The optical waveguide and the method of manufacturing the same according to the invention are not limited to the above-described embodiments for carrying out the invention, modifications, and examples, and various design changes may be made without departing from the spirit of the invention.

The invention may be used in optical circuits, optical demultiplexing paths, and optical multiplexing paths for propagating optical signals such as optical fiber connectors and splitters.

What is claimed is:

1. An optical waveguide comprising:
   a core for propagating light from a first end face of the optical waveguide to a second end face of the optical waveguide;
   a clad covering the core; and
   a line convex part extending from the first end face of the optical waveguide to the second end face of the optical waveguide, the line convex part comprising a cavity enclosing air and used as a positioning mark inside the line convex part.

2. An optical waveguide according to claim 1, wherein the line convex part is formed from the same material as the core.

3. An optical waveguide according to claim 1, wherein the line convex part is formed in a size different from that of the core.

4. An optical waveguide according to claim 1, wherein the core, the clad, and the line convex part are made from a curable polymeric material.

5. An optical waveguide according to claim 1, wherein air is confined in the cavity.

6. An optical waveguide according to claim 1, wherein a plurality of the cavities are provided inside the line convex part.

7. An optical waveguide according to claim 6, wherein the plurality of cavities are disposed at uniform intervals.

8. An optical waveguide according to claim 6, wherein the plurality of cavities have a variety of shapes.

9. An optical waveguide according to claim 1, wherein the cavity is a mark defining a position of a cutting line for dicing, and
   the mark is provided outside a range of a cutting width of the cutting line.

10. An optical waveguide comprising:
    a core for propagating light;
    a clad covering the core;
    a line convex part extending along a line different from the core, the line convex part comprising a cavity used as a positioning mark inside the line convex part; and
    wherein the cavity is a mark defining a position of a cutting line for dicing,
    the mark is provided on the cutting line for dicing, and
    the cavity is formed such that a part of the cavity appears in the form of a concave that opens on a cut end face of the optical waveguide after dicing is performed.

11. A method of manufacturing an optical waveguide, comprising:
    forming a core and a line convex part on a bottom clad substrate, the line convex part having a cavity to be used as a positioning mark on a top surface thereof;

forming an uncured clad material on the bottom clad substrate excluding the cavity in an atmosphere including a gas to be confined in the cavity; and curing the clad material to confine the gas in the cavity.

12. A method of manufacturing an optical waveguide according to claim 11, wherein forming the line convex part comprises:

preparing a mold comprising a curable resin layer for mold formation and including a concave part for core formation corresponding to a shape of a convex part of the core, a concave part for line formation corresponding to the line convex part and a convex part for cavity formation corresponding to a shape of the cavity;

bonding the mold with the bottom clad substrate;

filling a gap between the bottom clad substrate and the concave part for core formation of the mold with a curable resin for core formation, filling a gap between the bottom clad substrate and the concave part for line formation with a curable resin for line formation, and curing the curable resin for core formation and the curable resin for line formation that fill the gaps with heat or light; and releasing the mold and the bottom clad substrate from each other.

* * * * *